United States Patent Office 3,368,972
Patented Feb. 13, 1968

3,368,972
HIGH MOLECULAR WEIGHT MANNICH BASES
AS ENGINE OIL ADDITIVES
Ferdinand P. Otto, Woodbury, N.J., assignor to Mobil Oil
Corporation, a corporation of New York
No Drawing. Filed Jan. 6, 1965, Ser. No. 423,866
7 Claims. (Cl. 252—47.5)

This invention relates to novel compositions of matter. Additionally, this invention relates to the use of these novel compositions of matter as engine oil additives.

A great deal of effort is being directed to providing a lubricant which will permit present-day automotive engines to be operated at a high level of efficiency over long periods of time. A difficulty arises because lubricating oils tend to deteriorate under the conditions of use, with attendant formation of sludge, lacquer and resinous materials which adhere to the engine parts, thereby lowering the operating efficiency of the engine. To counteract the formation of these deposits, certain chemical additives have been found which, when added to lubricating oils, have the ability to keep the deposit-forming materials suspended in the oil, so that the engine is kept clean and in efficient operating condition for extended periods of time, These added agents are known in the art as detergents or dispersants.

Metallo-organic compounds are particularly useful as additives in this respect. However, the troublesome deposits which form on the skirt of the piston and on the walls of the combustion chamber, as well as on valves and spark plugs are also partially attributable to these metal containing additives employed in the lubricant. Whenever oil is burned in the engine, as occurs with the oil film present on the cylinder wall during the combustion stroke, many metal containing additives present in the oil may form an ash which is partially deposited on the various surfaces of the combustion chamber and on those of the spark plugs and valves.

Accordingly, it is an object of this invention to provide novel compositions of matter which are metal-free detergents or dispersants for lubricants.

Several known non-metallic detergents have previously been used in lubricating compounds. However, they have not proved to be entirely satisfactory. Additives which are particularly effective are based upon condensation products of an hydroxyaromatic, an aldehyde and an amine, the so-called mannich reaction. These additives are multi-functional improvers especially adapted for mineral oils and as pour depressants therein. These compounds have also been recognized as exhibiting detergent properties. A preference has existed for the use of hydroxyaromatics which are unsubstituted, particularly phenol and alpha and beta naphthols. Hydroxyaromatic compounds which are substituted by a short chain alkyl group or by a relatively high molecular weight straight chain chlorinated aliphatic hydrocarbon are also suitable such as the wax phenols, referred to by E. A. Oberright, U.S. Patent 2,459,114. It is a particular object of this invention to provide improved additives of this nature which have especially high dispersant properties.

It has now been discovered that novel compositions of matter may be made from (1) a high molecular weight alkyl substituted phenol, wherein the alkyl substituent has an M.W. (molecular weight) of 600–3,000, preferably from 750–1,200, (2) an aldehyde and (3) an amine which contains an HN< group, i.e., an active hydrogen, wherein the respective molar ratio of reactants is 1:0.1–10:0.1–10. The reaction involved may be depicted as follows:

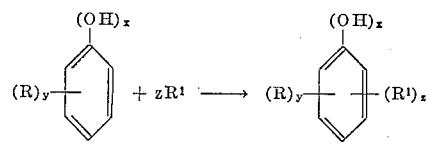

wherein, R is a hydrocarbon or substituted-hydrocarbon radical, $R^1$ is a polyalkylene compound where the repeating alkyl unit may be from $C_3$ to $C_5$, $x$ is an integer from 1 to 2, $y$ is an integer from 0 to 2 and $z$ is an integer from 1 to 2. According to infrared spectroscopy, the final product is a mixture of ortho-, para- and 2,4-substituted phenols. The present invention is further predicated upon the discovery that this group of oil soluble fractions, in amounts of 0.05 to 25%, will improve, a lubricant by exhibiting high dispersant properties therein.

Representative high molecular weight alkyl substituted phenols contemplated by the present invention are polypropylphenol, polybutylphenol, polyamylphenol and similarly substituted phenols. For example, in place of the phenol, high molecular weight alkyl substituted compounds of resorcinol, hydroquinone, catechol, cresol, xylenol, amyl phenol, hydroxydiphenyl, benzylphenol, phenylethylphenol, phenol resins, methylhydroxydiphenyl, guiacol, alpha and beta naphthol, alpha and beta methylnaphthol, tolylnaphthol, xylylnaphthol, benzylnaphthol, anthranol, phenylmethylnaphthol, phenanthrol, monomethyl ether of catechol, phenoxyphenol, chlorphenol, hydroxyphenyl sulfides and the like may be used.

Aldehydes contemplated by the present invention are the aliphatic aldehydes, typified by formaldehyde (such as trioxymethylene), acetaldehyde, and aldol (β-hydroxy butyraldehyde); aromatic aldehydes, representative of which is benzaldehyde; heterocyclic aldehydes, such as furfural; etc. The aldehyde may contain a substituent group such as hydroxyl, halogen, nitro and the like; in short, any substituent which does not take a major part in the reaction. Preference, however, is given to the aliphatic aldehydes, formaldehyde being particularly preferred.

The amines contemplated herein are those which contain an amino group characterized by the presence of at least one active hydrogen atom. Such amines may contain only primary amino groups, only secondary amino groups, or both primary and secondary groups. Typical amines are the polyalkylpolyamines, ethylenediamine, propylenediamine, polyalkene polyamines (e.g., diethylene triamine, triethylene tetramine); the aromatic amines o-, m- and p-phenylene diamine, diamino naphthalenes; the acid substituted polyalkylpolyamines, N-acetyl tetraethylenepentamine, and the corresponding formyl-, propionyl-, butyryl-, and the like N-substituted compounds; and the corresponding cyclized compounds formed therefrom, such as the N-alkyl amines of imidazolidine and pyrimidine. Secondary heterocyclic amines which are suitable are those characterized by attachment of a hydrogen atom to a nitrogen atom in the heterocyclic group. Representative of the amines contemplated herein are morpholine, thiomorpholine, pyrrole, pyrroline, pyrrolidine, indole, pyrazole, pyrazoline, pyrazolidine, imidazole, imidazoline, imidazolidine, piperidine, phenoxazine, phenthiazine and their substituted analogs. Substituent groups attached to the carbon atoms of these amines are typified by alkyl aryl, alkaryl, aralkyl, cycloalkyl, and amino compounds referred to above.

The polyalkyl phenols of this invention may be made by reacting 0.1 to 10 moles of a phenol with 1 mole of a polyalkylene in the presence of an alkylating catalyst, such as $BF_3$ (including the etherate, phenolate or phosphate complexes), $BF_3$ or HCl gas, $AlCl_3$, at 80° C. to 250° C. This process is particularly effective when conducted by reacting 1 to 1.5, or especially 1.25 moles, of phenol to 1 mole of a polyalkylene compound in the presence of a $BF_3$ phenolate at about 150° C. The product is conveniently dissolved in an aromatic solvent and then washed with water to remove unreacted components. Upon filtration and removal of the aromatic solvent by distillation; the product, a clear, viscous oil, remains.

The preparation of the high molecular weight alkyl-substituted phenols used in this invention may be illustrated by the preparation of polypropylphenol from phenol and polypropylene with a $BF_3 \cdot 2C_6H_5OH$-catalyst. For example, the following was charged into a 30 gallon glass lined Pfaudler kettle:

34 kg. (42.5 mols) polypropylene (M.W.=800)
5 kg. (42.5 mols+25% $x$, $s$) phenol 1.7 from the phenolate complex
2.25 kg. $BF_3 \cdot 2C_6H_5OH$ 26% $BF_3$ (585 g. $BF_3$)

The mixture was heated and stirred for four hours at 300° F., then it was cooled down to 175° F. and 14 kg. toluene, 3.4 kg. butyl alcohol and 34 kg. distilled water were added to wash out the $BF_3$ and the unreacted phenol. After that the mixture in the kettle was washed with 5% aqueous KOH solution to remove any remaining phenol, then with 5% aqueous KCl solution to neutralize the unreacted KOH and finally three times with distilled water until neutral to litmus at a temperature in the vicinity of 150° F.

The washed mixture was filtered through a Sparkler Horizontal plate filter using ¾ lb. of Hyflo filter aid (diatomaceous earth) and then the toluene and butyl alcohol were stripped off under vacuum (30–40 mm.) at 300° F. The product, a clear, brown, viscous oil, gave the following analysis:

Active hydrogen (Zerevitinov determination):
    Theory _____ mmoles $CH_4/g$__ 1.1
    Found _____ do____ 0.85
Yield based on the active H+analysis=76.5%.
Chromatographic clay separation=73.5% yield.

The high molecular weight alkyl substituted phenol used in this invention may be prepared by any other suitable means. The following examples illustrate the preparation of the high molecular weight mannich bases used in this invention, wherein amounts are by weight, unless indicated otherwise.

EXAMPLE 1

This example illustrates the mannich reaction of polypropylphenol with dimethylamine and formaldehyde. The following reactants were employed:

Polypropylphenol (M.W.=900, active H+0.85)
    grams__ 50
Mineral oil (a solvent refined paraffin base oil which is a 100 sec. neutral at 100° F.) _____grams__ 50
9.5% aqueous dimethylamine solution (contains 12 g. amine) _____grams__ 130
37% aqueous formaldehyde (contains 8 g. aldehyde) cubic centimeters__ 22

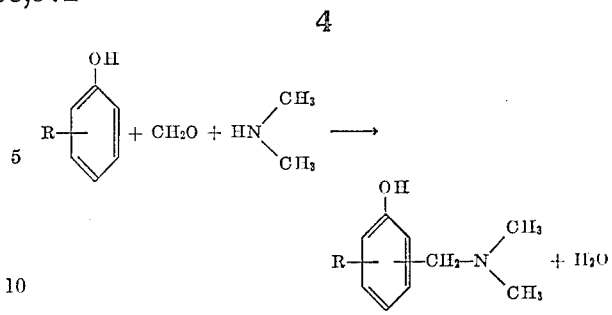

The apparatus consisted of a one-liter, four-necked reaction flask equipped with a mechanical stirrer, reflux condenser, thermometer, dropping funnel and later, a nitrogen inlet tube.

The polypropylphenol with the mineral oil and dimethylamine were charged to the flask as a temperature of 30° C. and the solution of formaldehyde was added dropwise through the dropping funnel with continuous stirring. After one hour the temperature was raised to 100° C. and held there for three hours while the dropping funnel was replaced by an inlet tube and nitrogen gas was passed through. The mixture, after adding 100 cc. toluene and 50 cc. butyl alcohol, was washed three times with hot water until neutral to litmus to remove the unreacted amine and formaldehyde. The solution was filtered and stripped under vacuum (5–10 mm.) in a nitrogen atmosphere to 200° C. The product was a clear, orange oil with the following analysis:

Theory: Active hydrogen, 0.41 mmoles $CH_4/g$.; oxygen, 0.89%; total nitrogen, 0.55%; basic nitrogen, 0.55%.
Found: Active hydrogen, 0.35 mmoles $CH_4/g$.; oxygen, 0.68%; total nitrogen, 0.45%; basic nitrogen, 0.47%.

EXAMPLE 2

This example illustrates the mannich reaction of polypropylphenol with dimethylaminopropylamine and formaldehyde. The following reactants were employed:

Polypropylphenol (M.W.=900, active H+0.85)
    grams__ 50
Mineral oil _____grams__ 50
Dimethylaminopropylamine (M.W. 102) __grams__ 12
37% aqueous formaldehyde _____grams__ 50
Xylene _____cubic centimeters__ 150

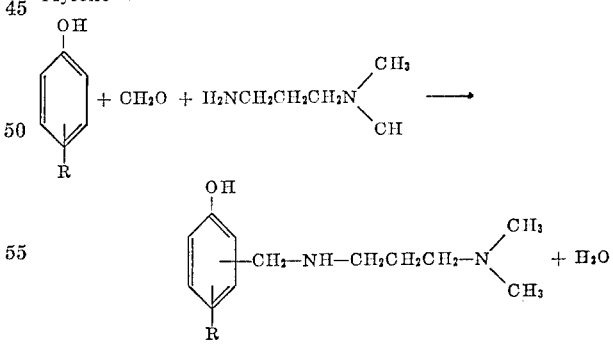

The apparatus consisted of a 500 ml. four-necked reaction flask equipped with a mechanical stirrer, reflux condenser, thermometer, dropping funnel and later, a nitrogen inlet tube.

The polypropylphenol with the mineral oil and dimethylaminopropylamine were charged to the flask at room temperature and the solution of formaldehyde was added dropwise through the dropping funnel during a half-hour period with continuous stirring. A cloudy mixture was formed, the temperature rose to 50° C. and 150 cc. xylene was added while the dropping funnel was replaced by an inlet tube and nitrogen gas was passed through. The mixture was refluxed for three hours and after cooling down was washed with hot water to remove the unreacted amine until neutral to litmus. Then the xylene was stripped off under vacuum (5–10 mm.) at 200° C. The product, a clear, light brown oil gave the following analysis:

Theory: Total nitrogen, 1.08%; basic nitrogen, 1.08%.
Found: Total nitrogen, 0.91%; basic nitrogen, 0.89%.

EXAMPLE 3

This example illustrates the mannich reaction of polypropylphenol with tetraethylenepentamine and paraformaldehyde (ratio 2:1:2). The following reactants were employed:

Polypropylphenol (M.W.=900, act.
    H+0.85) _____gram__ 2,200
Tetraethylenepentamine _____gram__ 187
Paraformaldehyde _____gram__ 59.4

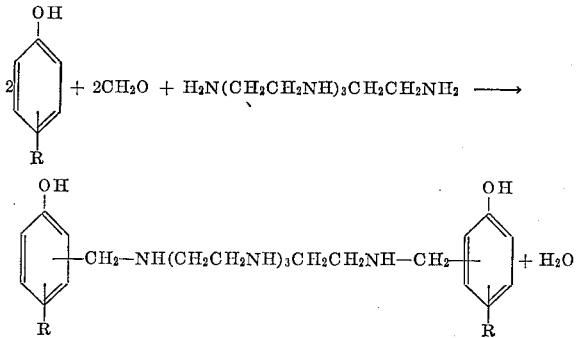

The apparatus consisted of a five liter, four-necked reaction flask equipped with a mechanical stirrer, reflux condenser with a Dean-Stark water take-off, thermometer, dropping funnel and later, a nitrogen inlet tube.

The polypropylphenol and paraformaldehyde were charged to the flask at a temperature of 70° C. and the tetraethylenepentamine was added dropwise through the dropping funnel with stirring. The reaction mixture was stirred and heated to 150° C. in the presence of nitrogen and held at this temperature for four hours. During this time 34 cc. water was evolved (theory 36 cc.). The product was filtered hot by suction through an electrically heated Buchner funnel containing a layer of Hyflo clay (a diatomaceous clay filter aid).

The filtrate was a clear, brown, viscous oil with the following analysis:

Percent theory: Total nitrogen, 2.86; basic nitrogen, 2.86. Percent found: Total nitrogen, 2.61; basic nitrogen, 2.31.

EXAMPLE 4

This example illustrates the mannich reaction of polybutylphenol with tetraethylenepentamine and paraformaldehyde (ratio 2:1:2). The following reactants were employed:

Tetraethylenepentamine _____gram__ 15
Paraformaldehyde _____gram__ 5
Polybutylphenol (M.W.=1000) _____gram__ 200

The same procedure was followed as in Example 3. The final product was a clear, brown, viscous oil with the following analysis:

Percent theory: Total nitrogen, 2.50; basic nitrogen, 2.50. Percent found: Total nitrogen, 2.42; basic nitrogen, 1.90.

EXAMPLE 5

This example illustrates the mannich reaction of polypropylphenol with N-acetyl-tetraethylenepentamine and paraformaldehyde (ratio 2:1:2). The following reactants were employed:

Polypropylphenol (M.W.=900, act.
    H+0.85) _____gram__ 2,000
N-acetyl-tetraethylenepentamine _____gram__ 196
Paraformaldehyde _____gram__ 50

The apparatus consisted of a five liter, four-necked reaction flask equipped with a mechanical stirrer, reflux condenser with a Dean-Stark water take-off, thermometer and later, a nitrogen inlet tube.

The polypropylphenol and N-acetyl-tetraethylenepentamine were charged to the flask at a temperature of 60° C. and the paraformaldehyde was added slowly in a period of one-half hour. The reaction mixture was heated and stirred in the presence of nitrogen to 200° C. and held at this temperature for four hours. During this time 30 cc. water was evolved (theory 30 cc.). The product was filtered hot by suction through an electrically heated Buchner funnel containing a layer of Hyflo clay, and a clear, brown viscous oil was obtained with the following analysis:

Percent theory: Total nitrogen, 2.30; basic nitrogen, 1.84. Percent found: Total nitrogen, 2.43; basic nitrogen, 1.70.

EXAMPLE 6

This example illustrates the mannich reaction of polypropylphenol with diethylenetriamine and paraformaldehyde (ratio 1:0.75:1). The following reactants were employed:

Polypropylphenol (M.W.=900, act.
    H+0.85) _____gram__ 2,200
Diethylenetriamine _____gram__ 144.43
Paraformaldehyde _____gram__ 55

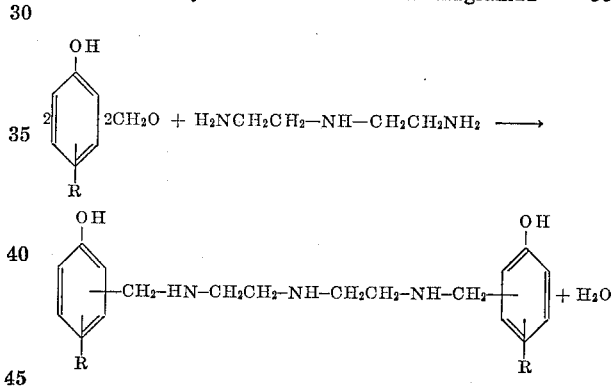

The apparatus consisted of a five liter, four-necked reaction flask equipped with a mechanical stirrer, thermometer, reflux condenser and later a Dean-Stark water take-off was added to the condenser. The polypropylphenol and diethylenetriamine were charged to the flask at a temperature of 60° C. and the paraformaldehyde was added slowly over a period of 50 minutes. The reaction mixture was stirred and heated to 120° C. and held there for two hours. At this point a Dean-Stark water take-off was added, nitrogen gas was introduced and the temperature raised to 150° C. and held there for two and one-half hours. During this time 30 cc. water was evolved (theory 30 cc.). The mixture was stripped under vacuum (5–10 mm.) for one hour at 150° C. and 50 g. unreacted amine was recovered. The product was a clear, brown viscous oil which gave the following analysis:

Percent theory: Total nitrogen, 1.62; basic nitrogen, 1.62. Percent found: Total nitrogen, 1.65; basic nitrogen, 1.60.

EXAMPLE 7

This example illustrates the mannich reaction of polypropylphenol sulfide with diethylenetriamine and paraformaldehyde. The following reactants were employed:

Polypropylphenol sulfide (50% Promor #5)
    (mineral oil) _____gram__ 200
Diethylenetriamine _____gram__ 8.75
Paraformaldehyde _____gram__ 5

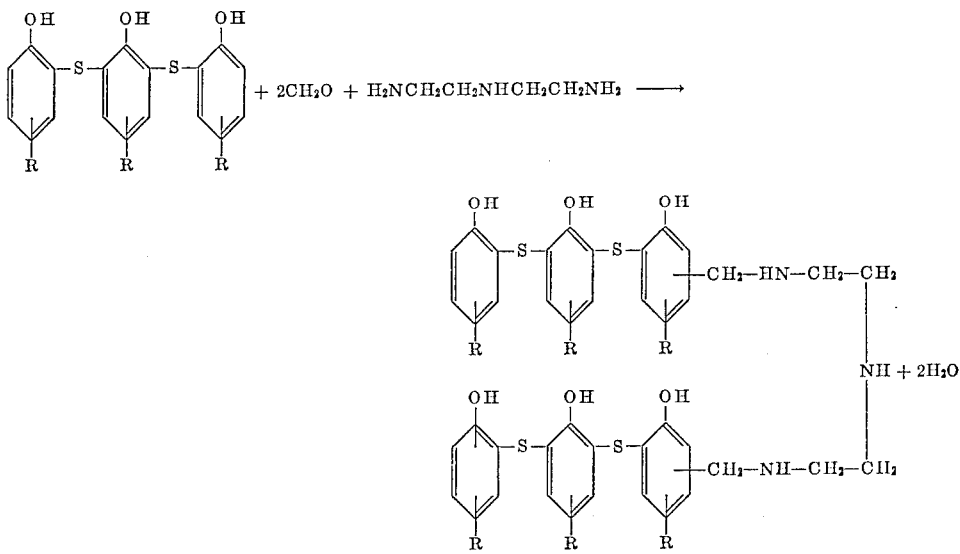

The apparatus was the same as in Example 6. The polypropylphenol sulfide mixture (50% Promor #5) and diethylenetriamine were charged to the flask at room temperature and the paraformaldehyde was added slowly over a period of ten minutes. The reaction mixture was stirred and heated to 180° C. for three and one-half hours. The mixture in the flask was stripped under vacuum (5–10 mm.) at 180° C. and some unreacted amine was recovered. The product, a dark brown oil gave the following analysis:

Percent theory: Total nitrogen, 0.77; basic nitrogen, 0.77. Percent found: Total nitrogen, 0.69; basic nitrogen, 0.36.

The utility of the mannich products of this invention as additives for motor oils has been shown by a number of comparative tests conducted on the base lubricant alone and on the lubricant blended with minor amounts of the mannich products described in the preceding examples. Both bench tests and engine tests were employed.

The bench tests were the Sulfuric Acid Neutralization Test [1] and Pyruvic Acid Dispersion Test.[2]

Table 1 summarizes the results of the bench tests. (Rating: The *higher* the percentage of the *pyruvic acid* test results, the better the additive. The *lower* the value of the *sulfuric acid* test, the better the additive.)

The engine tests used were the L-1 Caterpillar test [3] and the low temperature deposition test.[4] The base oil used in the tests was an S.A.E. 30, straight grade oil containing 59% 318 Stk and 41% Stk with an S.U.V. at 210° F. of 64.1. Table 2 summarizes the results of the engine tests.

---

[1] This method gives a measure of the ability of detergent additives to neutralize strong acids formed in engines operating on sulfur containing fuels. $H_2SO_4$ is mixed with a heated blend of the additive and the oil. A solution of this is formed in isooctane which is then centrifuged to separate insolubles. The optical density of the clear solution is then measured. From this value the optical density of the original additive blend diluted to a corresponding amount with isooctane is subtracted. The difference gives the optical density of the dispersed $H_2SO_4$ reaction products. The optical density of an acetone extraction of the isooctane-oil solution is then determined. The average optical density of the oil-isooctane solution is expressed as the optical density of the dispersed $H_2SO_4$ reaction product. The average density of the acetone solution is expressed as the optical density of the non-dispersed $H_2SO_4$ reaction products. The total of these values or either one alone is used in the evaluation of detergent additives.

[2] This method gives a measure of the dispersant value of additives and serves to predict the performance of detergent additives in engines operating on low sulfur content fuels. When used in combination with the neutralization of $H_2SO_4$ bench test procedures it serves to predict the performance of detergent additives in engines operating on high sulfur content fuels. Pyruvic acid is mixed with a heated blend of the additive and the oil. The mixture is diluted with benzene and centrifuged to separate insolubles. The insolubles are dissolved in acetone. The optical density of the oil-benzene solution gives the total amount of color. From this value the optical density of the initial additive blend diluted with benzene to a corresponding amount is subtracted. This corrected value is expressed as the optical density of the dispersed pyruvic acid polymer. The optical density of the acetone solution is expressed as the optical density of the non-dispersed pyruvic acid polymer. These values are used in the evaluation of the detergent additives.

[3] L-1 Caterpillar Test.—The L-1 Caterpillar test is a full scale engine test used to determine the characteristics of an oil with respect to piston cleanliness. The diesel fuel used in the tests was a high-sulfur content fuel (1.0% sulfur). A single cylinder 4-cycle Caterpillar engine is operated at 1000 r.p.m. under brake load of 19.8 HP; the oil temperature is about 150° F. and the jacket temperature is 180° F.

[4] Low Temperature Deposition Test (L.T.D.T.).—A technique for evaluating the low duty deposition characteristics of crankcase lubricants using CLR single cylinder engine. The procedure specifies a cyclic jacket temperature operating 3 hours at 120° F. and 1 hour at 200° F. for a total of 180 hours. The engine speed is held constant at 1800 r.p.m. with a loading of about 7 HP throughout the test.

---

TABLE I.—BENCH TESTS

| Item | Blend of 3% Active Ingredient Plus 1% Corrosion Inhibitor [a] in Base Oil [b] | Pyruvic Acid, Percent | Sulfuric Acid |
|---|---|---|---|
| 1 | Example 1 | 76.3 | 0.004 |
| 2 | Example 2 | 86.9 | 0.001 |
| 3 | Example 3 | 98.7 | 0.013 |
| 4 | Example 4 | 74.8 | 0.004 |
| 5 | Example 5 | 99.3 | 0.002 |
| 6 | Example 6 | 98.6 | 0.002 |
| 7 | Example 7 | 85.3 | 0.003 |
| 8 | Base Oil with 1% Corrosion Inhibitor | 58.6 | 0.102 |

[a] 1,3-dimethyl-butyl zinc dithiophosphate.
[b] S.A.E. 30 grade mineral oil, S.U.V. at 210° F. of 64.1.

TABLE II.—ENGINE TESTS

| Item | Type Additive in Base Oil[1] Plus 1% Corrosion Inhibitor[2] | L-1 Test Results With 3% Additives | | | |
|---|---|---|---|---|---|
| | | Hours | Piston Rating | Lacquer Demerits | Percent Top Groove Packing |
| 1 | Example 5 | 120 | 99.6 | 0.20 | 0 |
| | | 235 | 99.1 | 0.20 | 6 |
| | | 480 | 97.4 | 1.30 | 13 |
| 2 | Example 6 | 120 | 99.8 | 0.00 | 1.00 |
| | | 230 | 99.6 | 0.10 | 1.00 |
| | | 480 | 94.0 | 3.90 | 12.00 |

| | LTDT-Results With 1% Additive (180 Hours) | | | |
|---|---|---|---|---|
| | Piston | Oil | Oil Ring | Total |
| | Skirt Varnish | Screen Percent Clogging | Slot Percent Plugging | Engine Sludge |
| Example 5 | 8.4 (10=clean) | 0 | 0 | 49.7 (50=clean) |

[1] S.A.E. 30 grade mineral oil, S.U.V. at 210° F. of 64.1.
[2] 1,3-dimethyl-butyl zinc dithiophosphate.

The piston rating scale is from 0 to 100, 100 indicating a clean rating; in the remaining ratings, aside from the two above noted, 0 indicates a clean rating.

These tests indicate the substantial improvements in lubricants which can be obtained by the use of the novel compositions of matter of this invention. In particular, the excellent dispersant properties of these higher molecular weight mannich bases should be noted.

The additives of this invention can be used in any one of a wide variety of oils of lubricating viscosity, such as natural, refined or synthetic oils, or in blends of such oils. These oils may be prepared with or without auxiliary conventional additives such as: oiliness and extreme pressure agents; corrosion, oxidation and rust inhibitors; viscosity index improving agents; coloring agents and auxiliary detergents.

The invention has been described in terms of specific embodiments set forth in detail, but it should be understood that these are by way of illustration only and that the invention is not necessarily limited thereto. Alternative embodiments will become apparent to those skilled in the art in view of this disclosure, and accordingly, modifications of the product and process disclosed herein are to be contemplated within the spirit of this invention.

I claim:

1. An improved lubricating oil comprising said lubricating oil and 0.05 to 25% by weight of said lubricating oil of a condensation product of (1) a high molecular weight alkyl-substituted hydroxyaromatic compound wherein said alkyl substituent has a molecular weight of 600–3000, (2) an amine, which contains an HN< group, and (3) an aldehyde wherein the respective molar ratio of reactants is 1:0.1–10:0.1–10.

2. An improved lubricating oil comprising 0.05 to 25% by weight of the oil of a condensation product of (1) a polypropyl-substituted hydroxyaromatic compound, wherein the polypropylene has a molecular weight of 600–3000, (2) an amine, which contains an HN< group and (3) an aldehyde, wherein the respective molar ratio of reactants is 1:0.1–10:0.1–10.

3. The lubricating oil compositions of claim 1 wherein the molecular weight of the alkyl substituent is 750 to 1,200.

4. The lubricating oil of claim 1 wherein the aldehyde is selected from the group consisting of formaldehyde and paraformaldehyde.

5. The lubricating oil of claim 1 wherein the alkyl-substituted hydroxyaromatic compound is selected from the group consisting of an alkyl-substituted phenol and an alkyl-substituted phenol sulfide.

6. The lubricating oil of claim 1 wherein the amine is selected from the group consisting of polyalkylpolyamines, polyalkenepolyamines, aromatic amines and acid-substituted polyalkylpolyamines.

7. The lubricating oil of claim 1 wherein the amine is selected from the group consisting of dimethylamine, dimethylaminopropylamine, tetraethylenepentamine, N-acetyl-tetraethylenepentamine and diethylenetriamine.

References Cited

UNITED STATES PATENTS

| | | | |
|---|---|---|---|
| 2,336,006 | 12/1943 | Fuller | 252—51.5 |
| 2,363,134 | 11/1944 | McCleary | 252—51.5 |
| 2,410,911 | 11/1946 | Wasson et al. | 252—51.5 |
| 2,453,850 | 11/1948 | Mikeska et al. | 252—51.5 |
| 2,459,112 | 1/1949 | Oberright | 252—51.5 |
| 2,962,442 | 11/1960 | Andress | 252—51.5 |
| 3,036,003 | 5/1962 | Verdol | 252—51.5 |

DANIEL E. WYMAN, *Primary Examiner.*

L. G. XIARHOS, W. H. CANNON, *Assistant Examiners.*

Disclaimer

3,368,972.—*Ferdinand P. Otto*, Woodbury, N.J. HIGH MOLECULAR WEIGHT MANNICH BASES AS ENGINE OIL ADDITIVES. Patent dated Feb. 13, 1966. Disclaimer filed Oct. 22, 1971, by the assignee, *Mobil Oil Corporation*.

Hereby enters this disclaimer to claim 6 of said patent.
[*Official Gazette March 7, 1972.*]

Disclaimer

3,368,972.—*Ferdinand P. Otto*, Woodbury, N.J. HIGH MOLECULAR WEIGHT MANNICH BASES AS ENGINE OIL ADDITIVES. Patent dated Feb. 13, 1968. Disclaimer filed Mar. 1, 1972, by the inventor, the assignee, *Mobil Oil Corporation*, consenting.

Hereby enters this disclaimer to claim 6 of said patent.

[*Official Gazette December 5, 1972.*]